United States Patent
Potter et al.

(10) Patent No.: US 7,849,299 B2
(45) Date of Patent: Dec. 7, 2010

(54) MICROPROCESSOR SYSTEM FOR SIMULTANEOUSLY ACCESSING MULTIPLE BRANCH HISTORY TABLE ENTRIES USING A SINGLE PORT

(75) Inventors: Terrence Matthew Potter, Austin, TX (US); Jon A. Loschke, Austin, TX (US)

(73) Assignee: Applied Micro Circuits Corporation, San Diego, CA (US)

( * ) Notice: Subject to any disclaimer, the term of this patent is extended or adjusted under 35 U.S.C. 154(b) by 470 days.

(21) Appl. No.: 12/115,514

(22) Filed: May 5, 2008

(65) Prior Publication Data

US 2009/0276611 A1    Nov. 5, 2009

(51) Int. Cl.
G06F 7/38 (2006.01)
G06F 9/00 (2006.01)
G06F 9/44 (2006.01)
G06F 15/00 (2006.01)

(52) U.S. Cl. ........................................... 712/240
(58) Field of Classification Search ................. 712/240
See application file for complete search history.

(56) References Cited

U.S. PATENT DOCUMENTS 5,758,143 A * 5/1998 Levitan ....................... 712/240
5,805,878 A * 9/1998 Rahman et al. ............. 712/239
6,347,369 B1 * 2/2002 Witt ........................... 712/240
6,920,549 B1 * 7/2005 Ukai ........................... 712/219
7,472,263 B2 * 12/2008 Yokoi ......................... 712/239

* cited by examiner

Primary Examiner—Eddie P Chan
Assistant Examiner—Corey Faherty
(74) Attorney, Agent, or Firm—Law Office of Gerald Maliszewski; Gerald Maliszewski (57) ABSTRACT

Provided is a means for accessing multiple entries from a branch history table (BHT) in a single clock cycle, in the context of pipelined instruction processing. In a first clock cycle, a plurality of conditional branch instructions is fetched. A value is accessed from a global history record (GHR) of conditional branch resolutions and predictions for a fetched conditional branch instruction. An associated instruction address is hashed with a left-shifted GHR value. The result is used to access a word in an indexed BHT stored in a single-port random access memory (RAM). The word comprises a branch direction count for the plurality of fetched conditional branch instructions. In a second clock cycle a conditional branch instruction is executed at an execute stage and the BHT is written with an updated branch direction count in response to a resolution of the executed conditional branch instruction.

16 Claims, 5 Drawing Sheets

MICROPROCESSOR SYSTEM FOR SIMULTANEOUSLY ACCESSING MULTIPLE BRANCH HISTORY TABLE ENTRIES USING A SINGLE PORT

BACKGROUND OF THE INVENTION

1. Field of the Invention

This invention generally relates to a computer-instruction pipeline and, more particularly, to a system and method for enabling the use of a one-port random access memory (RAM) to implement a Gshare system in a pipelined processor.

2. Description of the Related Art

In the central processing units of general purpose computers, micro-architectures have evolved that permit the simultaneous processing of multiple instructions, for the purpose of increasing computational performance. Modern high-performance computers often employ one or more of three techniques to increase performance. Pipelined execution permits instruction execution to be partitioned into a series of sub-operations, each of which requires less time to execute than the entire instruction. Further, multiple instructions can be in different stages of execution, to allow parallel execution of instructions.

Superscalar execution is the technique of providing extra hardware to allow the execution of multiple instructions in parallel in any given stage of the pipeline. Out-of-order execution is a technique that permits many instructions to be in execution, and allows instructions to be executed in an order determined by their data dependencies, rather than the order in which they occur in the program. In general, this process permits instructions that would normally be stalled waiting for earlier instructions to complete, to bypass the "waiting" instructions.

Figure 1:
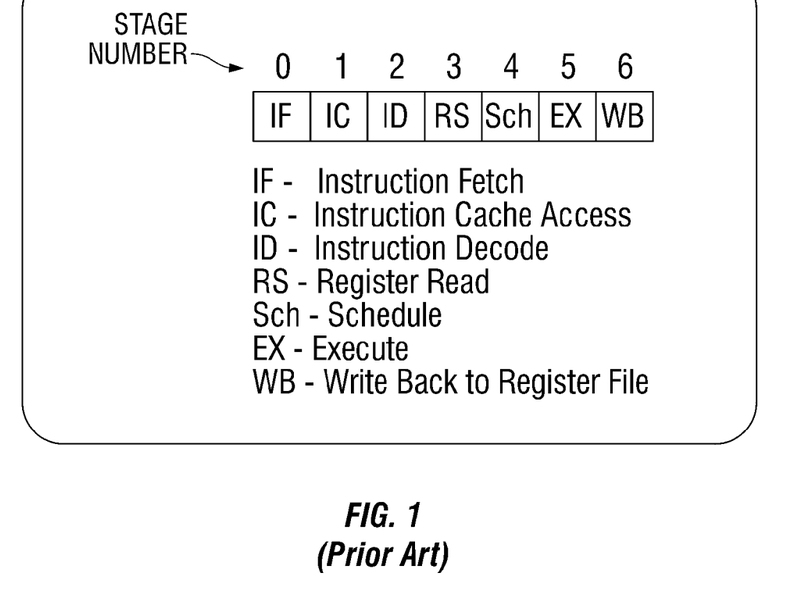
FIG. 1 is schematic block diagram depicting an exemplary superscalar, out-of-order pipeline (prior art).

FIG. 1 is schematic block diagram depicting an exemplary superscalar, out-of-order pipeline (prior art). Instruction execution is divided into a number of stages, and a specific operation occurs in each stage. In the example, instruction fetch occurs in stage 0. To fetch an instruction, a fetch address must be calculated in the Instruction Fetch (IF) stage. This address is used to access the instruction (or multiple instructions, in the case of superscalar machines) from the instruction cache or memory in the IC stage. The instructions are decoded in the ID stage. The register values are read in the RS stage and possibly placed into a structure such as a reservation station to await the availability of other operands. The instructions which are ready for execution are scheduled for execution in the Sch stage. The instruction is actually executed in the EX stage. Finally, the instruction is reordered into program order and committed to the architectural resources in the WB stage. In addition, there may be queues between the stages such as an instruction buffer between the IC and ID stages.

Each stage within the pipeline must occur in order. In order to achieve high performance, at least one new instruction enters the pipeline every cycle, and each instruction in the pipeline moves to a new stage. Each stage takes inputs and produces outputs, which are stored in an output buffer associated with the stage. One stage's output buffer is typically the next stage's input buffer. Such an arrangement permits all the stages to work in parallel and therefore yields a greater throughput than if each instruction had to pass through the entire pipeline before the next instruction can enter the pipeline. When the pipeline is delayed or has to be cleared, latency is created in the processing of each instruction in the pipeline. As explained in more detail below, if "bubbles" are created, which are cycles in which no work is performed, the overall number of instructions completed per unit period is reduced.

In this type of architecture, many instructions can be "in flight"; that is, in various stages of execution, simultaneously. If a stream of instructions has no branches, the pipeline can be filled and never need to be flushed. The time a program takes to execute is then a function of the number of instructions, and the number of clock cycles each instruction takes to execute. Branch instructions disturb the flow of instructions through the pipeline. A conditional branch instruction includes some condition which, if satisfied, causes the program flow to change. Branch instructions typically have dependencies on other instructions which determine condition. Branch instructions occur roughly every 5-8 instructions in typical programs.

Once a branch instruction is fetched, other instructions are typically fetched from sequential addresses following the branch. If the branch is "taken", the fetch path must be "redirected" to fetch instructions from the branch target address. However, instructions which sequentially followed the branch instruction that have already been fetched and must now be flushed from the pipeline, and new instructions must be fetched. This flushing and filling operation results in "bubbles" in the pipeline in which no work is done, lowering performance.

In order to reduce the number of pipeline bubbles, some architectures use a technique called "branch prediction" in which a conditional branch is predicted to be "taken" or "not taken" before the branch is actually executed. This reduces the delay between the fetching of the branch and the re-direction of the fetch stream. To the extent that the branch prediction is accurate, the pipeline stalls are reduced or eliminated.

One technique for accomplishing branch prediction is called Global History Prediction with Index Sharing or Gshare, for short. The Gshare technique uses a structure called a Branch History Table to store predictors. Each predictor is a counter that is updated when a branch instruction is executed (resolved). If the branch is "taken", the counter is incremented and if it is "not taken", it is decremented. The counter is saturating, such that when it reaches its maximum value, incrementing it again will not change the value and if it reaches its minimum value, decrementing it will not change the value. Typically, the counters are 2 bits in width, though this width is a design choice. The value of the predictor is used to decide if the branch prediction is "taken" or "not taken". The intuition is that if the branch has been "taken" frequently in the near past, then it will be "taken" in future and vice versa. Given this, if 2 bit counters are used, Table 1 shows the prediction for each value. Each counter has 4 states encoded as 00: strongly "not taken", 01: weakly "not taken", 10: weakly "taken", and 11: strongly "taken". If the BHT tracks a branch as either strongly "not taken" or weakly "not taken", and the branch is resolved "not taken", then the state becomes strongly "not taken".

TABLE 1

Predictor value meaning

| Counter value | Prediction |
|---|---|
| 00 | Strongly NOT Taken |
| 01 | Weakly NOT Taken |
| 10 | Weakly Taken |
| 11 | Strongly Taken |

The BHT is indexed by a number which is formed by hashing 6 the address of the branch instruction with the value in the Global History Shift Register (GHSR) or Global History Register (GHR). If the BHT contains $2^N$ predictors, N bits are needed to select a predictor.

Figure 2:
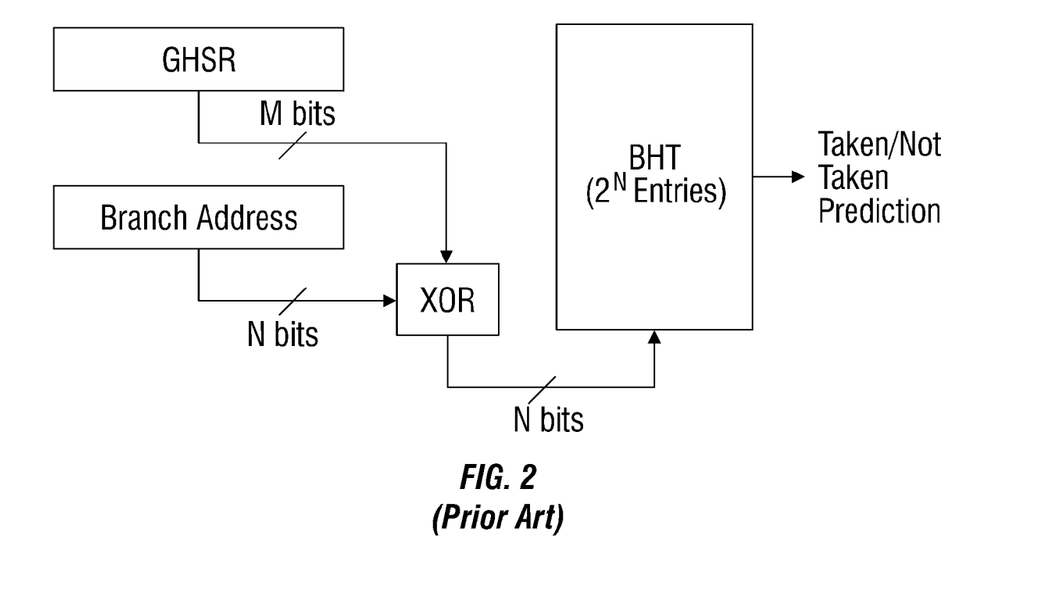
FIG. 2 is a schematic block diagram depicting a Gshare scheme for indexing a BHT (prior art).

FIG. 2 is a schematic block diagram depicting a Gshare scheme for indexing a BHT (prior art). The GHSR is a shift register of M bits, where M is usually less than N. When a branch instruction is executed, the decision to take the branch or not is made and the branch is said to be "resolved". When the branch is resolved, the value in the GHSR is updated by shifting in a 1 if the branch is taken and a 0 if the branch is not taken. The effect is to form a pattern of 1's and 0's which reflect the directions taken by the M most recent branches. This number is combined with the branch address, typically lower order address bits are exclusive-ORed (XOR'd) with the GHSR, to form the N-bit index. This index is then used to select the predictor in the BHT.

Processor micro-architectures with extremely long pipelines which allow many instructions in flight have a problem caused by fact that there may be many branch instructions fetched and placed in the instruction queue, which have not yet been identified as branches and predicted. This is the fetch-to-re-direct delay and arises due to the following problem. Instruction fetch occurs in stage 0. To fetch an instruction, a fetch address must be calculated in the Instruction Fetch (IF) stage. This address is used to access the instruction from the instruction cache or memory in the IC stage. The instruction is decoded in the ID stage. The register values are read in the RS stage and the instruction is scheduled for execution in the Sch stage. The instruction is actually executed in the EX stage and the result value is written back to the register file in the WB stage.

In this type of pipeline, the type of the instruction is not known until it reaches the decode stage (ID). Further, the branch is not resolved until it reaches the EX stage, when it is executed. This means that the BHT must be read in the IC stage, in parallel with the instruction cache access, to fetch the BHT entry for the instruction. The branch is resolved in the EX stage, at which point the BHT entry for that branch may need to be written to update its prediction. If the BHT entry is already "saturated", it will not need to be updated, but if it is not saturated, it must be incremented or decremented and then written back into the BHT. Thus, if a BHT entry is being predicted in IF and another branch is being resolved in EX, then the BHT must be designed to accommodate two accesses in a single clock cycle: one read and one write.

One solution to this problem is to design a structure with 2 ports: one read port and one write port, to accommodate the required bandwidth. This structure is typically called a register file. However, often only a standard RAM block is available, which is cheaper from the standpoints of area and complexity. A RAM block typically has only a single port that can be either read or written in a single cycle.

It would be advantageous the Gshare scheme could be modified to permit the use of a BHT implemented in a one-port RAM.

SUMMARY OF THE INVENTION

The principle advantage of implementing the Branch History Table in a standard RAM is the simplicity of design, as well as the lower cost due to the smaller silicon area of the RAM versus a custom multi-port register block. The present invention provides a modification of the BHT index generation, permitting a Gshare branch prediction scheme to be used with a RAM-based BHT.

Accordingly, a method is provided for accessing multiple entries from a BHT in a single clock cycle, in the context of a microprocessor system using pipelined instruction processing. The method accepts a first microprocessor instruction of consecutive operations at a fetch stage in a pipelined microprocessor execution process. In a first clock cycle, a plurality of conditional branch instructions are fetched, which are associated with a corresponding plurality of instruction addresses. A value is accessed from a global history record (GHR) of conditional branch resolutions and predictions for a fetched conditional branch instruction. An instruction address associated with the fetched conditional branch instruction is hashed with a left-shifted GHR value, creating a hash result. The hash result is used to access a word in an indexed BHT stored in a single-port random access memory (RAM). The word comprises a branch direction count for the plurality of fetched conditional branch instructions. In a second clock cycle a conditional branch instruction is executed at an execute stage. Also in the second cycle, the BHT is written with an updated branch direction count in response to a resolution of the executed conditional branch instruction. Alternately stated, there is no need to read the BHT for the next branch address, as that branch direction was already accessed in the first clock cycle.

Additional details of the above-described method and a pipelined instruction microprocessor system with a global history prediction record are provided below.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 3:
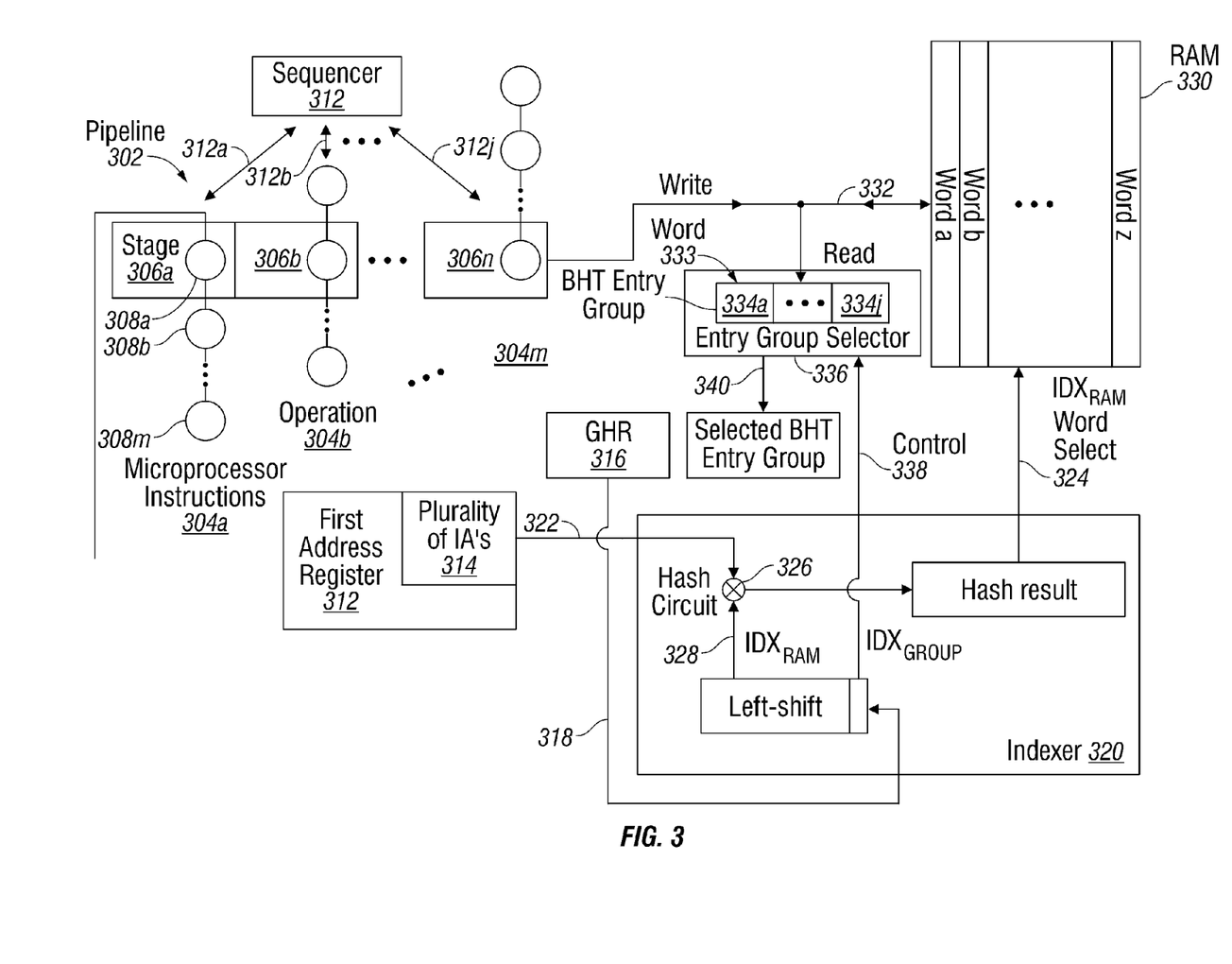
FIG. 3 is a schematic block diagram depicting a system for accessing multiple entries from a branch history table (BHT) in a single clock cycle, in the context of a microprocessor system using pipelined instruction processing.

FIG. 3 is a schematic block diagram depicting a system for accessing multiple entries from a branch history table (BHT) in a single clock cycle, in the context of a microprocessor system using pipelined instruction processing. The 300 system comprises a pipeline 302 including a plurality of sequential stages for parallel processing microprocessor instructions. For simplicity, a single pipeline is shown. However, in other aspect not shown, a plurality of pipelines may be used for branch, arithmetic logic unit (ALU), load/store, and floating point unit (FPU) functions. Microprocessor instructions 304a through 304m are depicted, where m is not limited to any particular value. Stages 306a through 306n are depicted, where n is not limited to any particular number. For example, FIG. 1 depicts a pipeline example where n=6. Returning to FIG. 3, in some aspects n=m. Each microprocessor instruction includes a plurality of consecutive operations. Microprocessor instruction 304a is depicted as including operations 308a through 308k, where k is not limited to any particular value. Although not explicitly labeled with a reference designator, microprocessor instructions 304b through 304m likewise include a plurality of operations depicted as circular elements. In some aspects, the number of operations in a microprocessor instruction equals the number of stages 306 in pipeline 302. The pipeline 302 includes one or more stages for processing a conditional branch instruction. For example, first stage 306a may be a fetch stage for fetching a plurality of conditional branch instructions associated with a corresponding plurality of instruction addresses in a first clock cycle. Note: for simplicity, it is generally assumed herein that the all instructions are conditional branch instructions.

As used herein, a "conditional branch instruction" is a branch instruction which is taken (change of flow) or not taken (fetch next sequential instruction) depending on a condition. The condition is usually the state of a register which is set by some other instruction or instructions. For instance, in the PowerPC Instruction Set Architecture (ISA), there is a dedicated Condition Register (CR). Bits in this register are set or cleared by other instructions, for instance, the Compare instruction compares the values in two registers and sets the CR bits based on the results. For instance, there is an "EQ" bit in the CR. If the two values are equal, the "EQ" bit is set. Thus the sequence cmp r1, r
beq HERE
add r1, r2 will compare values in registers 1 and 2 and if they are equal, the "branch if equal" (beq) instruction will redirect the instruction fetch to location labeled "HERE", if they are not equal, the next instruction following the branch will be fetched, in this case, the "add" instruction.

An "instruction address" is the address in memory at which the instruction is stored. All instructions are stored in memory and each memory location has an address. The addresses are essentially the code for the locations in the memory and are conventionally numbered from zero to the maximum number of bytes of in the memory, minus one.

A sequencer 310 has an interface on line 312 (312a through 312j) for accessing the pipelined stages and processing the operations. For example, sequencer 310 may be a block in a computer processor such as a reduced instruction set computer (RISC). A first address register 312 contains a plurality of instruction addresses (IAs) 314 associated with a plurality of conditional branch instructions. Also shown is a global history record (GHR) 316, which has an output on line 318 to supply a current GHR value, which is a history of conditional branch resolutions and predictions. Typically, the global history record 316 is a shift register.

An indexer 320 has an input on line 318 to accept a value for a fetched conditional branch instruction from the GHR 316, and input on line 322 to accept a instruction address associated with the fetched conditional branch instruction. The indexer 320 left-shifts the GHR value, hashes the left-shifted GHR value with the branch address, and supplies a hash result at an output on line 324. In one aspect a hashing circuit 326 performs an exclusive-OR (XOR) operation between a number representing the left-shifted GHR value on line 318 and a number representing the branch address on line 328. However, other types of hashing are also known in the art.

A single-port random access memory (RAM) 330 has an input on line 324 to accept the hash result and a port on line 332 to supply a word 333 from an indexed BHT comprising a branch direction count for the plurality of conditional branch instructions (associated with the plurality of IAs 314). The pipeline 302 includes an execution stage (e.g., stage 306n) for executing a conditional branch instruction and writing the BHT on line 332 with an updated branch direction count in a second clock cycle, in response to a resolution of the conditional branch instruction. More explicitly, the execution stage 306n does not actually write the BHT RAM 330, it supplies a taken/not-taken indicator to the branch pipeline. There the address of the predicted branch and the BHT entries are read at the time of prediction and are used to increment or decrement the BHT entry, and then write it to the BHT.

As noted above, a number of instructions are fetched in the first cycle, some of which may be conditional branch instructions. That is, the instruction types are unknown when they are fetched, and the instruction type is not determined until later in the decode stage. Therefore, it is assumed that all instructions are branches, requiring access the BHT to obtain predictions. If it is determined later that an instruction is not a conditional branch instruction, the information read from the BHT is discarded. For simplicity, the explanation of the system assumes that the instructions are conditional branch instructions.

In one aspect, the pipeline fetch stage 306a fetches $N_f$ consecutive instructions, some of all of which may be conditional branch instructions, and the RAM 330 supplies a word 333 with a plurality of BHT entry groups 334a through 334j, where j is not limited to any particular number. An entry group selector 336 has an input on line 332 to accept the word 333 from the RAM 330, a control input on line 338 for selecting a BHT entry group, and an output on line 340 to supply NUMgroup branch direction counts from the selected BHT entry group. The pipeline execution stage 306n writes the RAM 330 with NUMresolved updated branch direction counts, wherein NUMresolved is $\geq 1$.

The indexer 320 left-shifts the GHR value by LSghsr bits=$\log_2$(NUMgroup), creating an IDXram-bit left-shifted GHR value and an IDXgroup-bit index group. The indexer 320 hashes the left-shifted GHR value with the IDXram-bit branch address, creating an IDXram-bit word select on line 324. The RAM 330 includes a total of $2^{IDXram}$=NUMram words, which are represented as Word a through Word z.

NUMram=(NUMbht·WIDTHbht)/WIDTHram, where

NUMbht=the number of branch direction counts in the BHT;

WIDTHbht=the number of bits in a branch direction count; and,

WIDTHram=the number of bits in a word.

The indexer 320 supplies the IDXram-bit word select as the hash result on line 324 for accessing the word from RAM, and supplies the IDXgroup-bit index group on line 338 to the entry group selector 336 control input for selecting the BHT entry group from the word 333 supplied by the RAM; where, IDXgroup=$\log_2$(WIDTHram)/ (WIDTHbht·NUMgroup).

The entry group selector 336 supplies NUMgroup consecutive branch direction counts for conditional branch instructions having NUMgroup consecutive branch addresses.

In one aspect, the pipeline 302 is a degree n superscalar pipeline, meaning that n operations per clock cycle can be performed every clock cycle, and the fetch stage fetches 2n conditional branch instructions every other clock cycle. Then, the entry group selector 336 supplies NUMgroup=n branch direction counts. The pipeline execute stage 306n writes the RAM 330 with NUMresolved=n updated branch direction counts in the second clock cycle.

The BHT stored in RAM 330 includes a count of the most recent first branch resolutions. The BHT may increment the count in response to a branch instruction being "taken" and decrement the count in response to the branch instruction being "not taken". This example assumes that higher value counts are associated with "taken" predictions and lower value counts are associated with "not taken" predictions. Thus, the BHT branch prediction indicates a degree of confidence in the assumption that the first branch is "taken".

Additional details of speculative and non-speculative GHRs are provided in pending application Ser. No. 11/985,025, entitled SYSTEM AND METHOD FOR SPECULATIVE GLOBAL HISTORY PREDICTION UPDATING, which is incorporated herein by reference. Although not specifically shown, the system of FIG. 3 may include both a speculative GHR, which is accessed when branch instructions are fetched, and a non-speculative GHR, which is accessed when branch instructions are executed. Alternately stated, the GHR updating process disclosed herein is applicable to both types of GHRs.

Additional details of GHRs updated in response to "taken" branches are provided in pending application Ser. No. 12/023,303, entitled GLOBAL HISTORY BRANCH PREDICTION UPDATING RESPONSIVE TO TAKEN BRANCHES, which is incorporated herein by reference.

Although the system 300 of FIG. 3 has been depicted as a collection of connected modules, implying hardware, it should be understood that portions of the system may be enabled as coded instructions, stored in memory, and enabled using microprocessors or logic-coded state machines.

Functional Description

Figure 4:
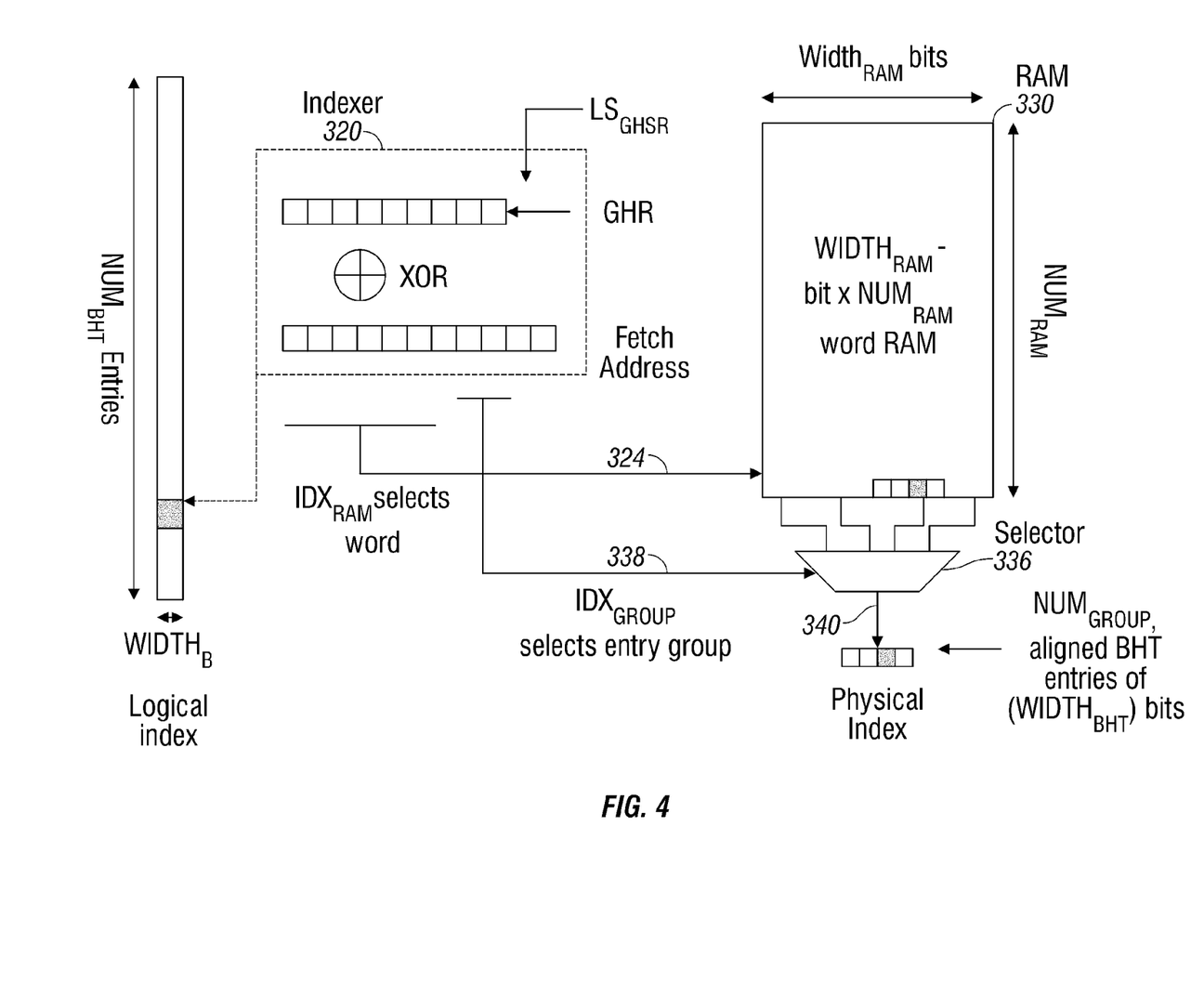
FIG. 4 is a block diagram depicting aspects of the system of FIG. 3 in greater detail.

FIG. 4 is a block diagram depicting aspects of the system of FIG. 3 in greater detail. To allow a single-port RAM to be used as the BHT, multiple BHT entries are fetched during a clock cycle. This process allows more bandwidth to be used as a tradeoff against additional ports. For example, suppose two BHT entries are fetched during the IC stage. On average, this frees up one cycle during which the BHT can be written during the update in the EX stage. This process can be extended to allow more BHT entries to be fetched, for example four or eight. If the processor is a superscalar machine, which can execute more than one instruction in a clock cycle, this scheme can be extended even further. For example, if the machine is a degree two superscalar, it may fetch 2 instructions in the fetch stage. Since both of these instructions can be branch instructions, at least 2 BHT entries need to be fetched. To allow a single-port RAM to be used, 4 BHT entries can be fetched simultaneously for each two instructions that are fetched. If the number of branches resolved in a clock cycle is one, then the BHT needs to be updated up to one time in each branch resolution cycle. If 4 BHT entries are fetched and 2 instructions are fetched, this results in twice as many BHT entries being fetched as instructions. This 2:1 ratio means that every other cycle is a "free" cycle available to write the BHT. In general, the number instructions fetch is $N_f$, the number of BHT entries fetched is $N_{BHT}$, and the number of BHT updates (branches resolved) in a cycle is $N_{UP}$, then, if $N_{UP} \leq N_{BHT} - N_f$; and, $N_{BHT} = 2 \cdot N_f$;

then a single-ported RAM can be used to implement the BHT. Thus, the number of BHT entries that needs to be fetched every other cycle is twice the number needed in a single cycle. Then, the equation becomes:

$$Nup \leq 2N_f - N_I$$

$$Nup \leq N_f.$$

The above equations assume that the read bandwidth is equal to the write bandwidth. That is, in one cycle the same number of bits can be read from RAM as can be written into RAM.

In order for the BHT entries which are fetched to be used for branch prediction, there should be a one-to-one correspondence between each BHT entry and each branch instruction. To insure that this is maintained, the order of the BHT entries must remain the same for successive BHT accesses. In other words, a particular branch path should cause the same BHT entries to be fetched, and they should be in the same addressed order. This can be accomplished by forcing the low order address bits used to fetch the instruction to be used to also access the BHT, which is a modification of the conventional Gshare scheme.

The definitions of the values used in FIG. 4 are as follows:

Selected Values
$N_f$=number of instructions fetched per clock cycle
NUMbht=total number of BHT entries
WIDTHbht=width, in bits, of a single BHT entry
WIDTHram=width, in bits, of the RAM word
NUMgroup=number of BHT entries to be read in a single access, also called the BHT entry group. Must be $\geq N_f$.

Derived Values

NUMram=(NUM*bht**WIDTH*bht*)/
 WIDTHram=number of RAM words

LSghsr=log 2(NUMgroup)=the number of bits to left shift the GHSR with respect to the fetch address IDXgroup=log 2(WIDTHram/
 (WIDTH*bht**NUMgroup))=number of address bits used to access the BHT entry group within RAM word IDXram=log 2(NUMram)=number of address bits used to select a word in the BHT RAM.

Figure 5:
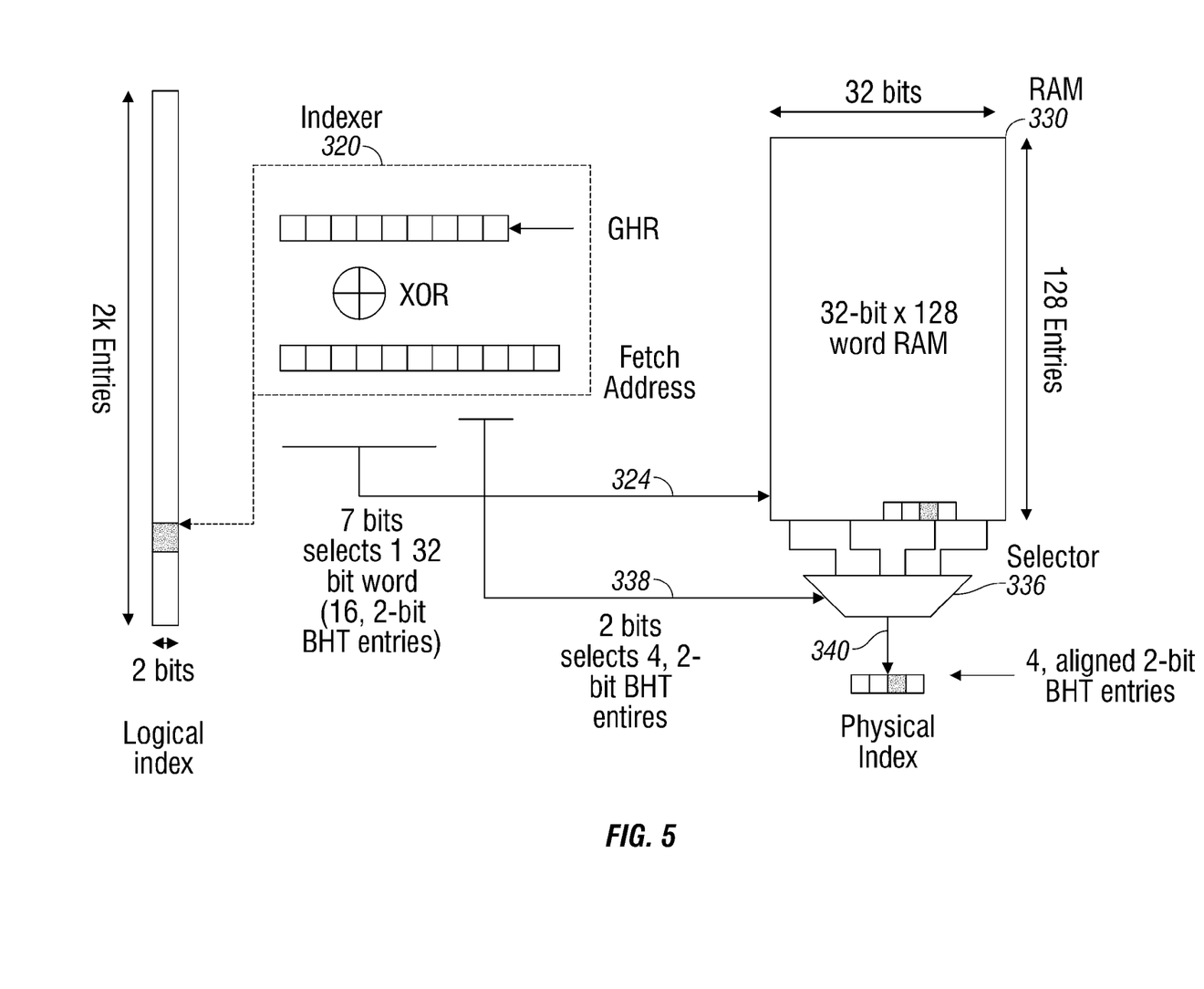
FIG. 5 is an example of the system depicted in FIG. 4.

FIG. 5 is an example of the system depicted in FIG. 4. As noted in FIG. 2, the index for accessing the BHT is conventionally formed by the exclusive-OR of the GHSR with the low order address bits of the fetch address. To maintain the congruence of the fetched instructions with the BHT entries fetched from the RAM, the present invention system does not permit some number of low-order address bits to be hashed with the GHR. To accomplish this, the GHR is left shifted with respect to the fetch address and some number of low-order address bits are used, unmodified, to index into the BHT. For instance, if BHT entries are 2 bits wide, 4 BHT entries are fetched in a single read access, and the RAM is 32 bits wide, then the GHR must be shifted 2 bits to the left with respect to the GHSR and then XOR'ed to form the index. Since a single read of the RAM results in 32 bits of data (or 16 BHT entries), an additional 2 bits of the index are needed to select the 4, 2-bit entries.

Figure 6:
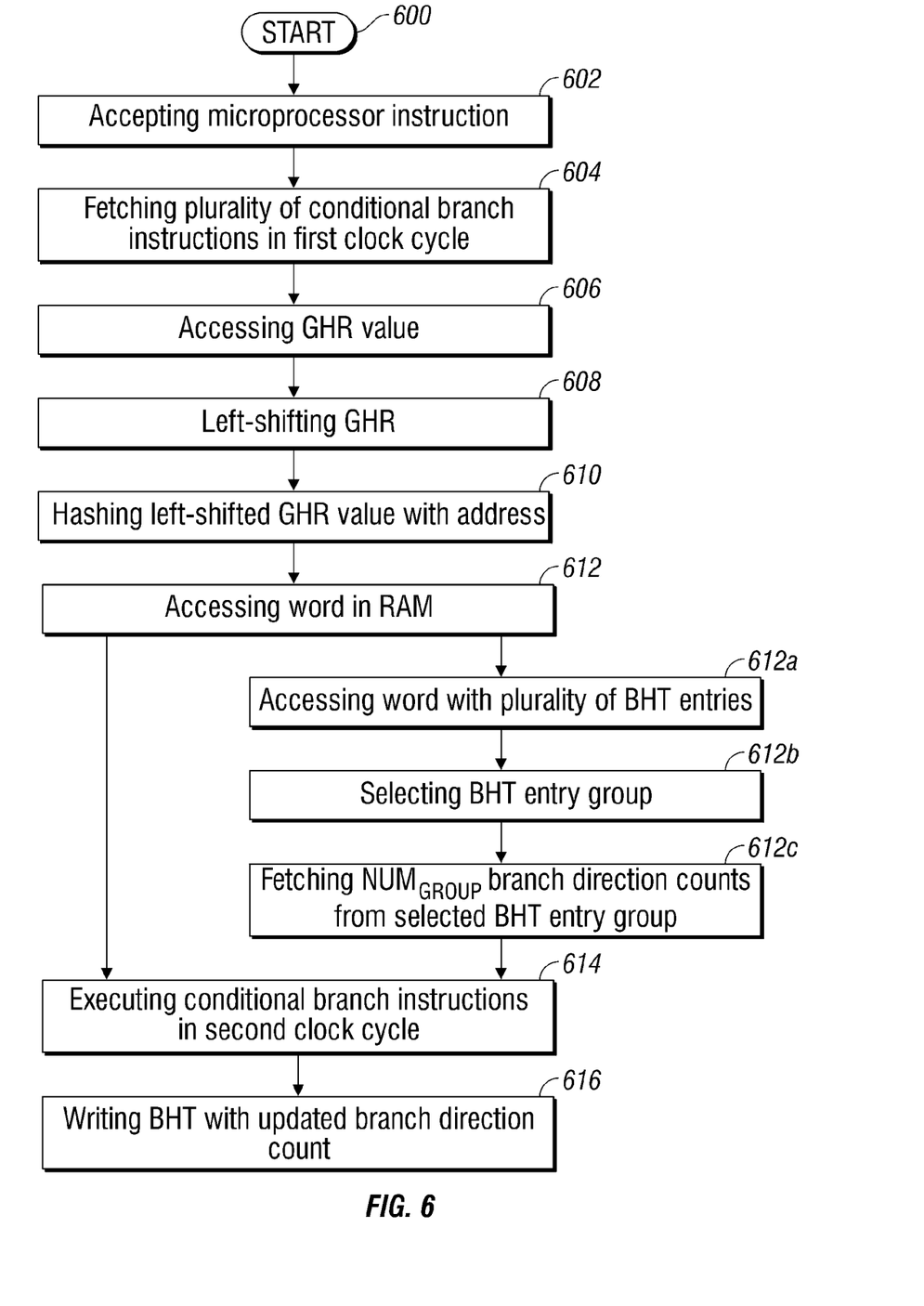
FIG. 6 is a flowchart illustrating a method for accessing multiple entries from a BHT in a single clock cycle, in a microprocessor system using pipelined instruction processing.

FIG. 6 is a flowchart illustrating a method for accessing multiple entries from a BHT in a single clock cycle, in a microprocessor system using pipelined instruction processing. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 600.

Step 602 accepts a first microprocessor instruction of consecutive operations at a fetch stage in a pipelined microprocessor execution process. In a first clock cycle, Step 604 fetches a plurality of conditional branch instructions associated with a corresponding plurality of instruction addresses. Step 606 accesses a value from a global history record (GHR) of conditional branch resolutions and predictions for a fetched conditional branch instruction. Step 608 left-shifts the GHR value. Step 610 hashes an instruction address associated with the fetched conditional branch instruction with the left-shifted GHR value, creating a hash result. Step 612 uses the hash result to access a word in an indexed BHT stored in a single-port random access memory (RAM), the word comprising a branch direction count for the plurality of fetched conditional branch instructions. Step 614 executes a conditional branch instruction at an execute stage in a second clock cycle. In the second cycle, Step 616 writes the BHT with an updated branch direction count in response to a resolution of the executed conditional branch instruction.

In one aspect, fetching the plurality of conditional branch instructions in Step 604 includes fetching Ni consecutive branch instructions, and accessing the word in the indexed BHT (Step 612) includes substeps. Step 612a accesses a word with a plurality of BHT entry groups. Step 612b selects a BHT entry group. Step 612c fetches (reads) NUMgroup branch direction counts from the selected BHT entry group. Then, writing the BHT with the updated branch direction count in Step 616 includes writing the BHT with NUMresolved updated branch direction counts, where NUMresolved is $\geq 1$.

In one aspect, left-shifting the GHR value in Step 608 includes left-shifting by LSghsr bits=$\log_2$(NUMgroup), creating an IDXram-bit left-shifted GHR value and an IDXgroup-bit index group. Then, hashing the left-shifted GHR value with the instruction address in Step 610 includes creating an IDXram-bit word select, and accessing the word in the indexed BHT in Step 612 includes accessing a BHT that includes a total of $2^{IDxram}$=NUMram words.

In another aspect, accessing the word in the indexed BHT (Step 612) includes:

NUMram=(NUM*bht*·WIDTH*bht*)/WIDTHram, where

NUMbht=the number of branch direction counts in the BHT;
WIDTHbht=the number of bits in a branch direction count; and,
WIDTHram=the number of bits in a word.

More explicitly, accessing the word with the plurality of BHT entry groups in Step 612a includes accessing a word using an IDXram-bit word select. Then, selecting the BHT entry group in Step 612b includes using the IDXgroup-bit index group to select a BHT entry group from the accessed word; where, IDXgroup=$\log_2$(WIDTHram)/
 (WIDTH*bht*·NUMgroup).

In another aspect, reading NUMgroup branch direction counts from the selected BHT entry in the accessed word in Step 612c includes reading NUMgroup consecutive branch direction counts for conditional branch instructions having NUMgroup consecutive branch addresses.

In a different aspect, accepting the first microprocessor instruction of consecutive operations at the fetch stage in the pipelined microprocessor execution process (Step 602) includes accepting the first microprocessor instruction at the fetch stage of a degree n superscalar pipeline. Then, fetching the plurality of conditional branch instructions in Step 604 includes fetching 2n conditional branch instructions every other clock cycle. Fetching NUMgroup branch direction counts from the selected BHT entry group in Step 612c includes fetching NUMgroup=n branch direction counts. Writing the BHT with NUMresolved updated branch direction counts in Step 616 includes writing the BHT with NUMresolved=n updated branch direction counts in the second clock cycle.

A system and method have been presented for accessing multiple entries from a branch history table (BHT) in a single clock cycle. Examples have been given to illustrate the invention. However, the invention is not limited to merely these examples. It should also be appreciated that the specific details of the pipeline given are for illustrative purposes only. The invention can be used in other pipeline architectures, including but not limited to: out-of-order execution and parallel or "superscalar" architectures. Other variations and embodiments will occur to those skilled in the art.

We claim:

1. In a microprocessor system using pipelined instruction processing, a method for accessing multiple entries from a branch history table (BHT) in a single clock cycle, the method comprising:

accepting a first microprocessor instruction of consecutive operations at a fetch stage in a pipelined microprocessor execution process;

in a first clock cycle, fetching a plurality of conditional branch instructions associated with a corresponding plurality of instruction addresses;

accessing a value from a global history record (GHR) of conditional branch resolutions and predictions for a fetched conditional branch instruction;

left-shifting the GHR value;

hashing an instruction address associated with the fetched conditional branch instruction with the left-shifted GHR value, creating a hash result;

using the hash result to access a word in an indexed BHT stored in a single-port random access memory (RAM), the word comprising a branch direction count for each of the fetched conditional branch instructions;

executing a conditional branch instruction at an execute stage in a second clock cycle; and, in the second cycle, writing the BHT with an updated branch direction count in response to a resolution of the executed conditional branch instruction.

2. The method of claim 1 wherein fetching the plurality of conditional branch instructions includes fetching $N_f$ consecutive branch instructions;

wherein accessing the word in the indexed BHT includes:
accessing a word with a plurality of BHT entry groups;
selecting a BHT entry group;
fetching NUMgroup branch direction counts from the selected BHT entry group; and, wherein writing the BHT with the updated branch direction count includes writing the BHT with NUMresolved updated branch direction counts, where NUMresolved is $\geq 1$.

3. The method of claim 2 wherein left-shifting the GHR value includes left-shifting by LSghsr bits=$\log_2$(NUMgroup).

4. The method of claim 3 wherein left-shifting the GHR value includes creating an IDXram-bit left-shifted branch address and an IDXgroup-bit index group;

wherein hashing the left-shifted GHR value with the instruction address includes creating an IDXram-bit word select; and, wherein accessing the word in the indexed BHT includes accessing a BHT that includes a total of $2^{IDXram}$=NUMram words.

5. The method of claim 4 wherein accessing the word in the indexed BHT includes:

NUMram=(NUM*bht*·WIDTH*bht*)/WIDTHram, where

NUMbht=the number of branch direction counts in the BHT;
WIDTHbht=the number of bits in a branch direction count; and,
WIDTHram=the number of bits in a word.

6. The method of claim 5 wherein accessing the word with the plurality of BHT entry groups includes accessing a word using an IDXram-bit word select;

wherein selecting the BHT entry group includes using the IDXgroup-bit index group to select a BHT entry group from the accessed word; where, IDXgroup=$\log_2$(WIDTHram)/(WIDTH*bht*·NUMgroup).

7. The method of claim 6 wherein fetching NUMgroup branch direction counts from the selected BHT entry in the accessed word includes reading NUMgroup consecutive branch direction counts for conditional branch instructions having NUMgroup consecutive branch addresses.

8. The method of claim 2 wherein accepting the first microprocessor instruction of consecutive operations at the fetch stage in the pipelined microprocessor execution process includes accepting the first microprocessor instruction at the fetch stage of a degree n superscalar pipeline;

wherein fetching the plurality of conditional branch instructions includes fetching 2n conditional branch instructions every other clock cycle;

wherein fetching NUMgroup branch direction counts from the selected BHT entry group includes fetching NUMgroup=n branch direction counts; and, wherein writing the BHT with NUMresolved updated branch direction counts includes writing the BHT with NUMresolved=n updated branch direction counts in the second clock cycle.

9. In a microprocessor system using pipelined instruction processing, a system for accessing multiple entries from a branch history table (BHT) in a single clock cycle, the system comprising:

a pipeline including a plurality of sequential stages for accepting a first microprocessor instruction of consecutive operations, the pipeline including a fetch stage for fetching a plurality of conditional branch instructions associated with a corresponding plurality of instruction addresses in a first clock cycle;

a global history record (GHR) of conditional branch resolutions and predictions;

an indexer having an input to accept a value for a fetched conditional branch instruction from the GHR and input to accept an instruction address associated with the fetched conditional branch instruction, the indexer left-shifting the GHR value, hashing the left-shifted GHR value with the instruction address, and supplying a hash result at an output;

a single-port random access memory (RAM) having an input to accept the hash result and a port to supply a word from an indexed BHT comprising a branch direction count for each of the conditional branch instructions; and, wherein the pipeline includes an execution stage for executing a conditional branch instruction and writing the BHT with an updated branch direction count in a second clock cycle, in response to a resolution of the conditional branch instruction.

10. The system of claim 9 wherein the pipeline fetch stage fetches $N_f$ consecutive branch instructions;

wherein the RAM supplies a word with a plurality of BHT entry groups;

the system further comprising:

an entry group selector having an input to accept the word from the RAM, a control input for selecting a BHT entry group, and an output to supply NUMgroup branch direction counts from the selected BHT entry group; and, wherein the pipeline execution stage writes the RAM with NUMresolved updated branch direction counts, wherein NUMresolved is $\geq 1$.

11. The system of claim 10 wherein the indexer left-shifts the GHR value by LSghsr bits=$\log_2$(NUMgroup).

12. The system of claim 11 wherein the indexer left-shifts the GHR value, creating an IDXram-bit left-shifted GHR value and an IDXgroup-bit index group, and hashes the instruction address with the IDXram-bit left-shifted GHR value, creating an IDXram-bit word select; and, wherein the RAM includes a total of $2^{IDXram}$=NUMram words.

13. The system of claim 12 wherein:

NUMram=(NUM$bht$·WIDTH$bht$)/WIDTHram, where

NUMbht=the number of branch direction counts in the BHT;

WIDTHbht=the number of bits in a branch direction count; and,

WIDTHram=the number of bits in a word.

14. The system of claim 13 wherein the indexer supplies the IDXram-bit word select as the hash result for accessing the word from RAM, and supplies the IDXgroup-bit index group to the entry group selector control input for selecting the BHT entry group from the word supplied by the RAM; where, IDXgroup=$\log_2$(WIDTHram)/
(WIDTH$bht$·NUMgroup).

15. The system of claim 14 wherein the entry group selector supplies NUMgroup consecutive branch direction counts for conditional branch instructions having NUMgroup consecutive branch addresses.

16. The system of claim 10 wherein the pipeline is a degree n superscalar pipeline and the fetch stage fetches 2n conditional branch instructions every other clock cycle;

wherein the entry group selector supplies NUMgroup=n branch direction counts; and, wherein the pipeline execute stage writes the RAM with NUMresolved=n updated branch direction counts in the second clock cycle.

* * * * *